Nov. 10, 1953 P. H. GOLDSMITH 2,658,428
ADJUSTABLE CYLINDER PAPERMAKING MACHINE
Original Filed Feb. 3, 1945 12 Sheets-Sheet 1
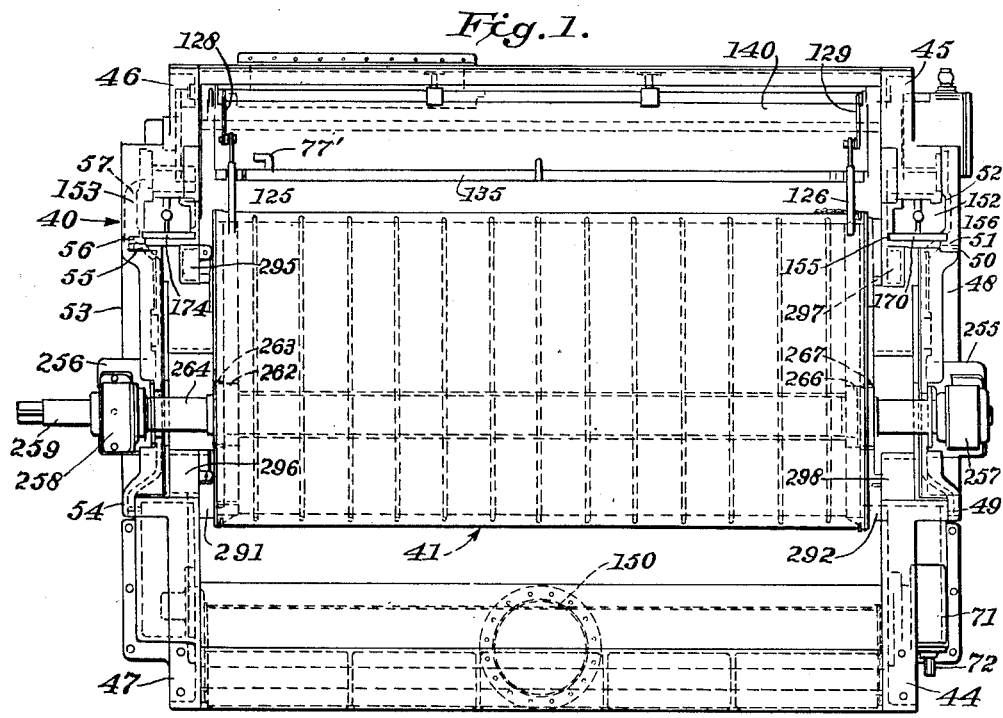
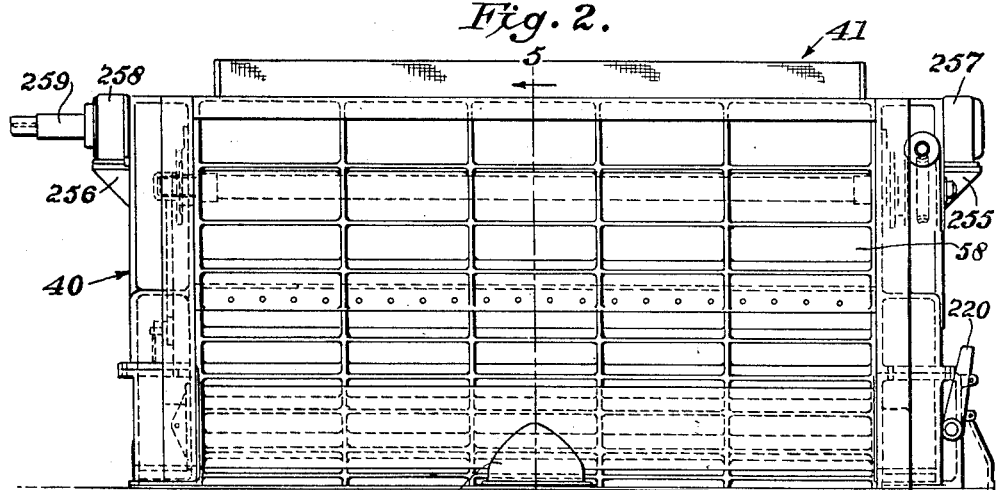
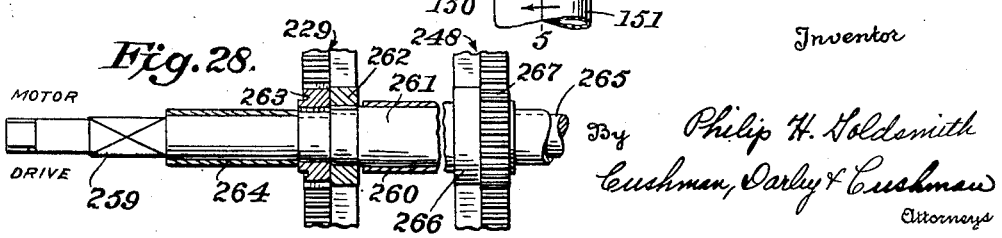
Inventor
Philip H. Goldsmith
By Cushman, Darby & Cushman
Attorneys Nov. 10, 1953     P. H. GOLDSMITH     2,658,428
ADJUSTABLE CYLINDER PAPERMAKING MACHINE
Original Filed Feb. 3, 1945     12 Sheets-Sheet 2

Inventor
Philip H. Goldsmith
By Cushman, Darby & Cushman
Attorneys.

Nov. 10, 1953  P. H. GOLDSMITH  2,658,428
ADJUSTABLE CYLINDER PAPERMAKING MACHINE
Original Filed Feb. 3, 1945  12 Sheets-Sheet 3

Inventor
Philip H. Goldsmith
By Cushman, Darby & Cushman
Attorney

Nov. 10, 1953 P. H. GOLDSMITH 2,658,428
ADJUSTABLE CYLINDER PAPERMAKING MACHINE
Original Filed Feb. 3, 1945 12 Sheets-Sheet 4

Inventor
Philip H. Goldsmith
By Cushman, Darby & Cushman
Attorney

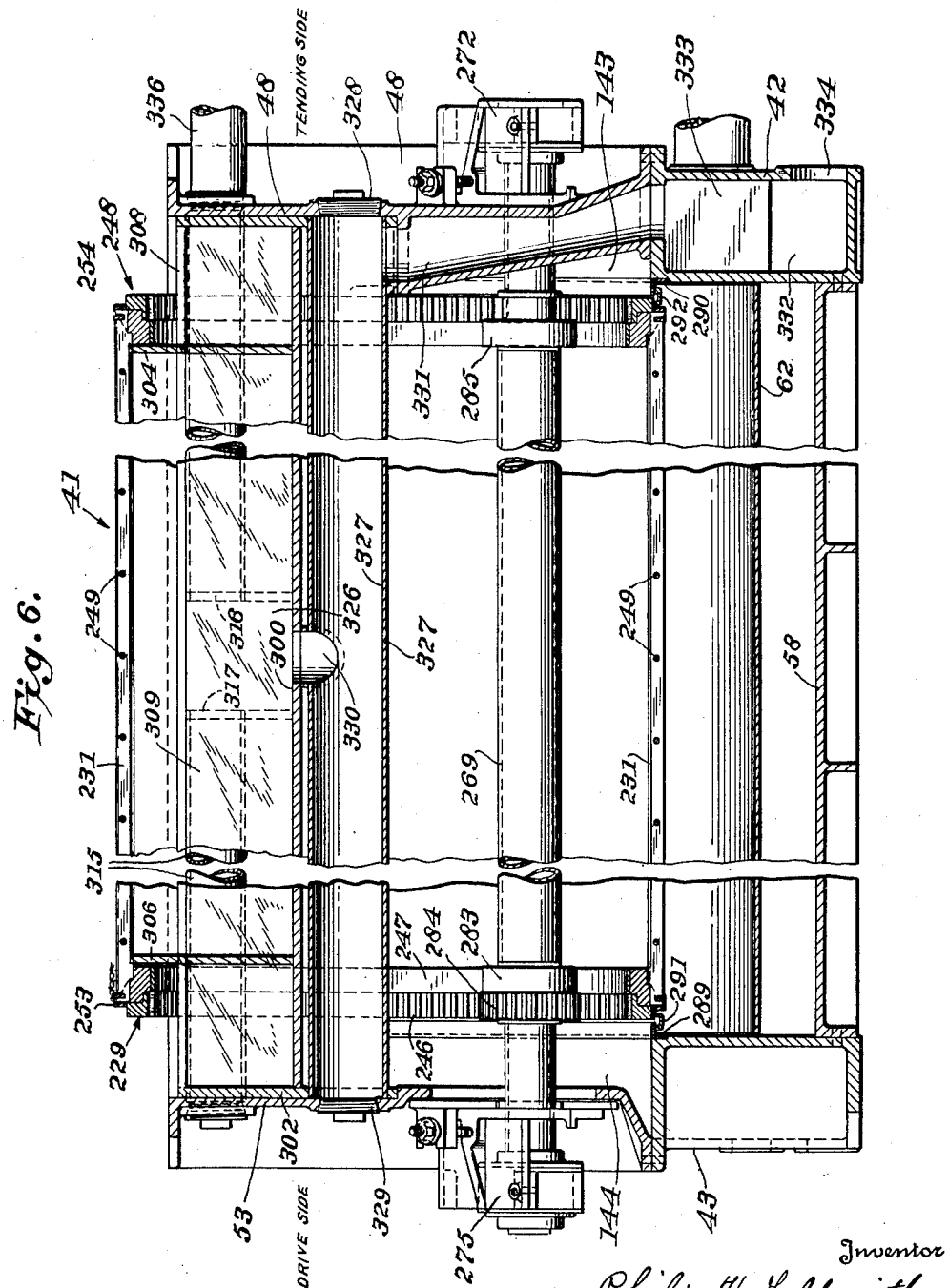

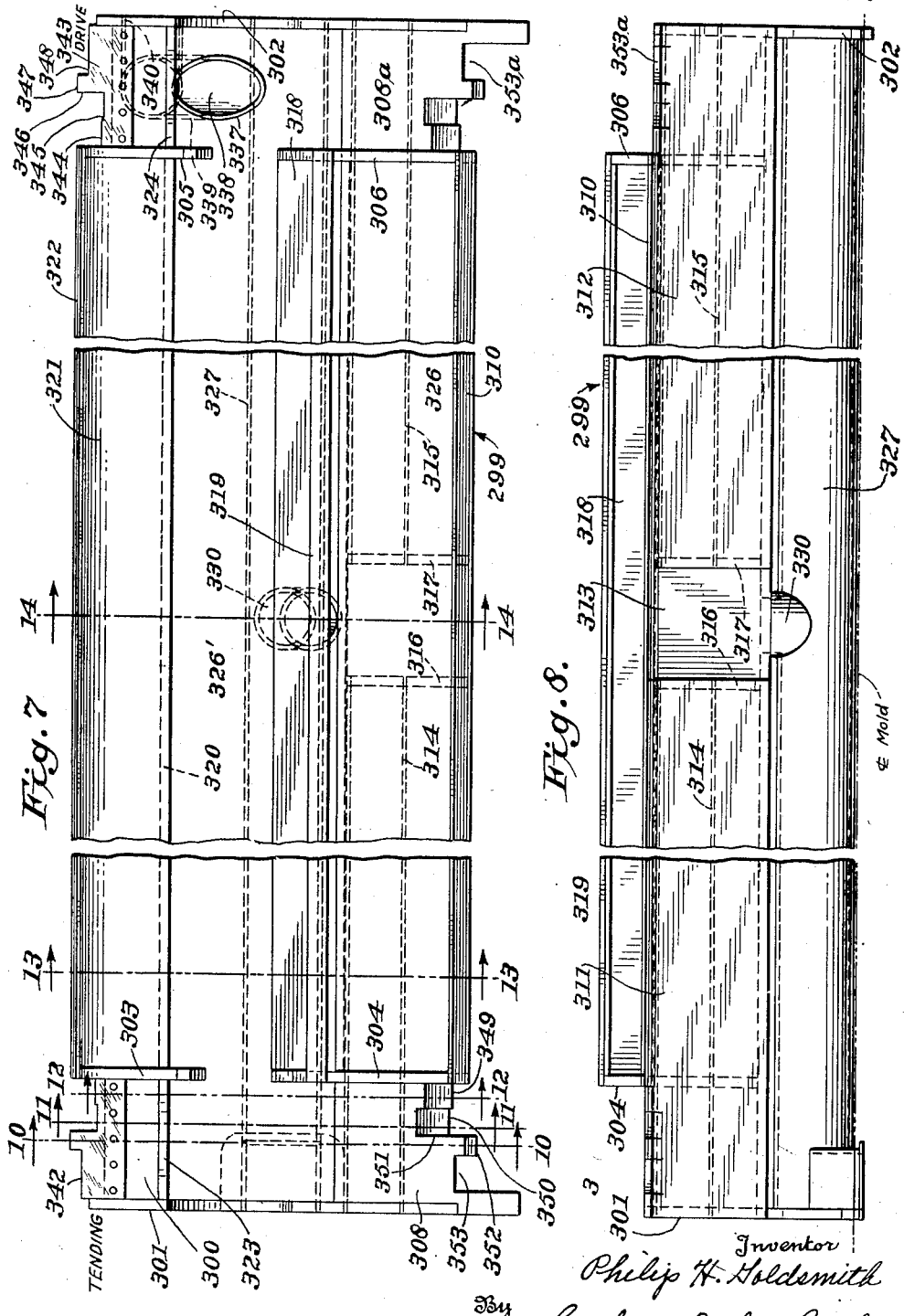

Nov. 10, 1953  P. H. GOLDSMITH  2,658,428
ADJUSTABLE CYLINDER PAPERMAKING MACHINE
Original Filed Feb. 3, 1945  12 Sheets-Sheet 8
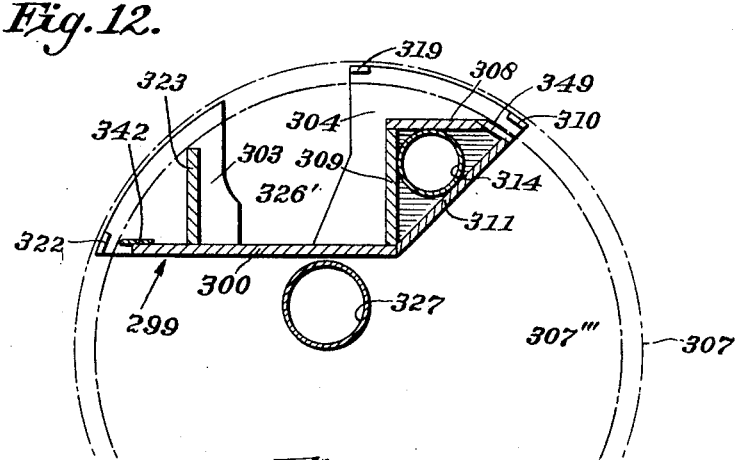
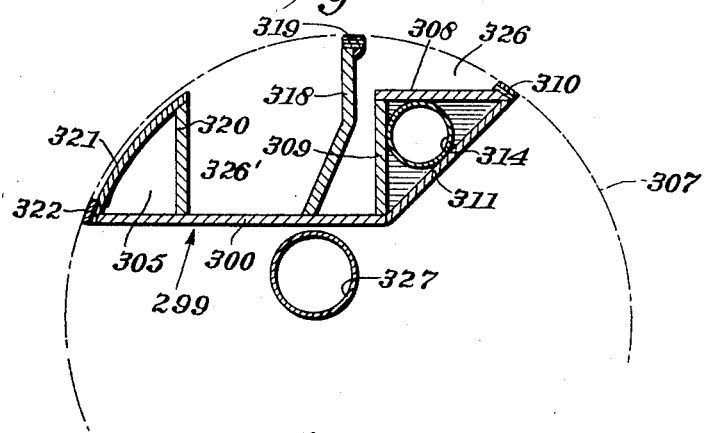
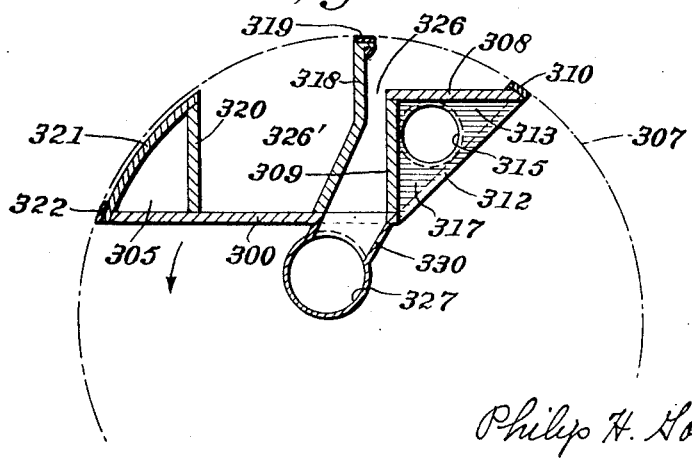
Inventor
Philip H. Goldsmith
By Cushman, Darby & Cushman
Attorney Nov. 10, 1953  P. H. GOLDSMITH  2,658,428
ADJUSTABLE CYLINDER PAPERMAKING MACHINE
Original Filed Feb. 3, 1945  12 Sheets-Sheet 9
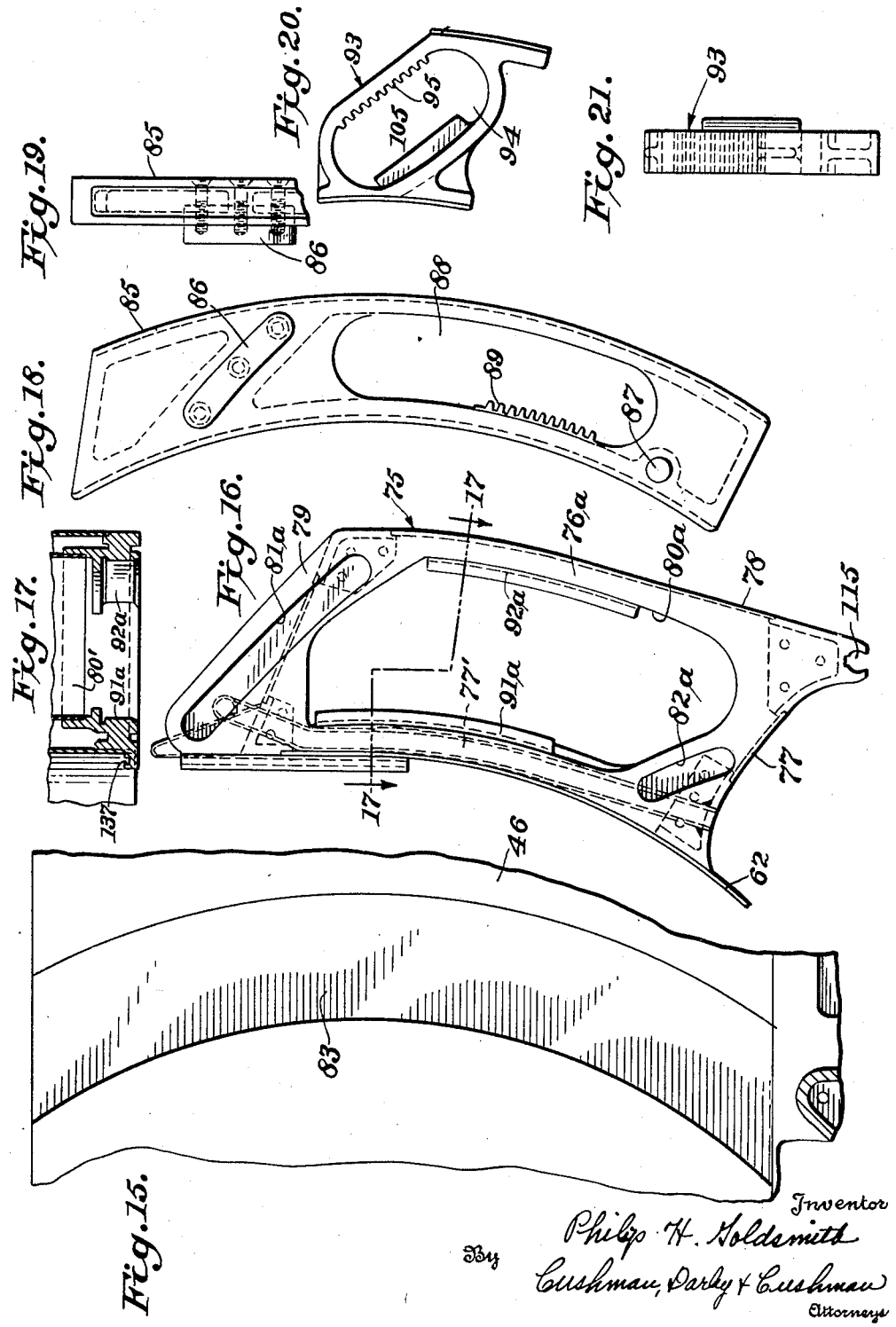

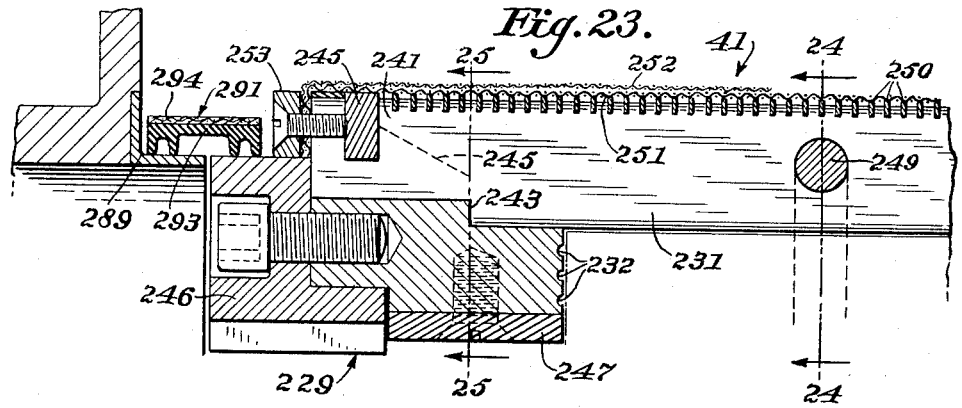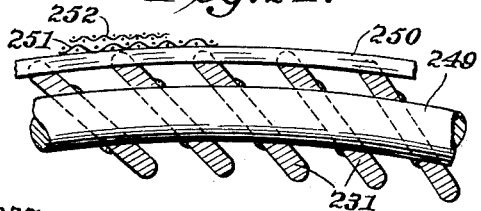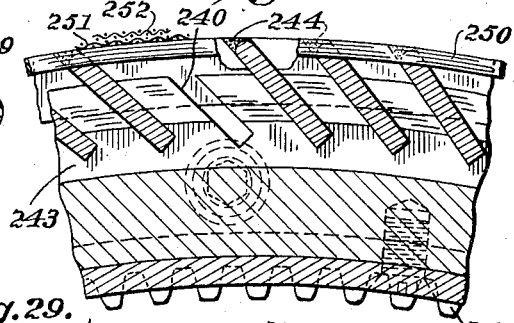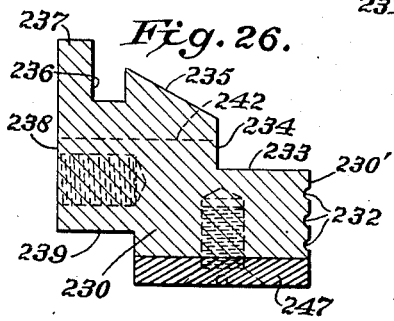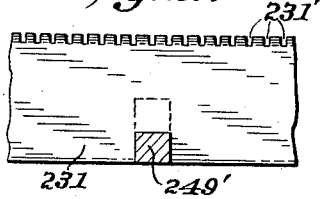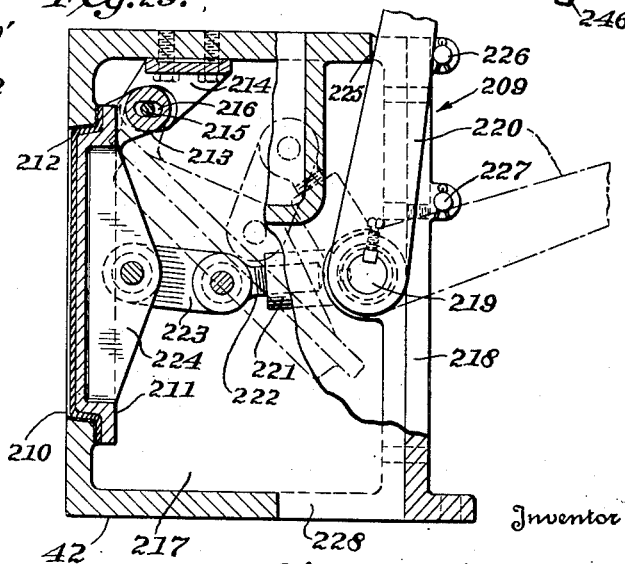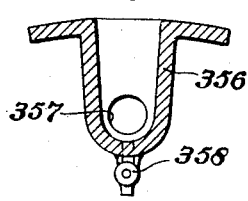

Nov. 10, 1953 P. H. GOLDSMITH 2,658,428
ADJUSTABLE CYLINDER PAPERMAKING MACHINE
Original Filed Feb. 3, 1945 12 Sheets-Sheet 11
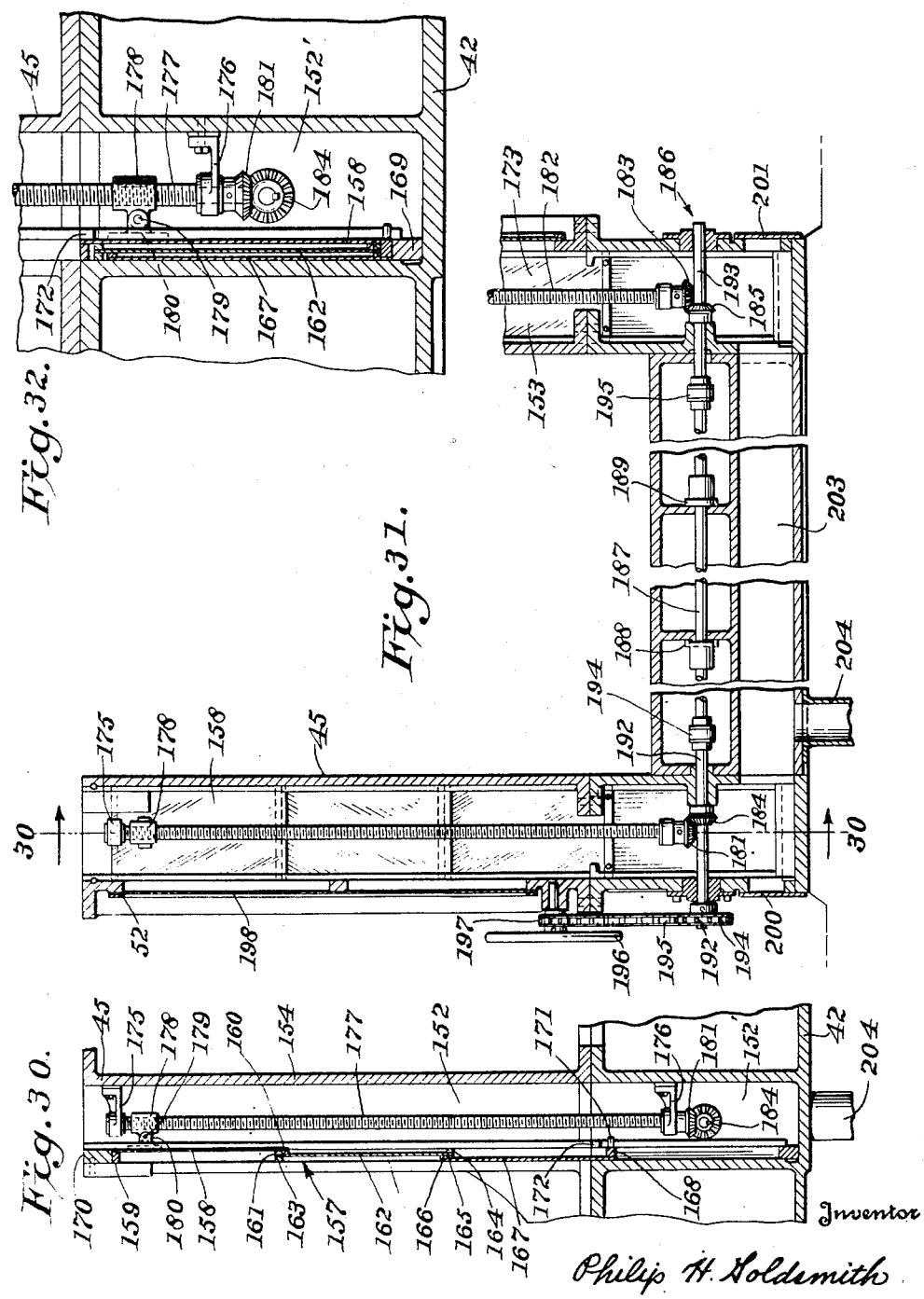
Inventor
Philip H. Goldsmith
By Cushman, Darby & Cushman
Attorney

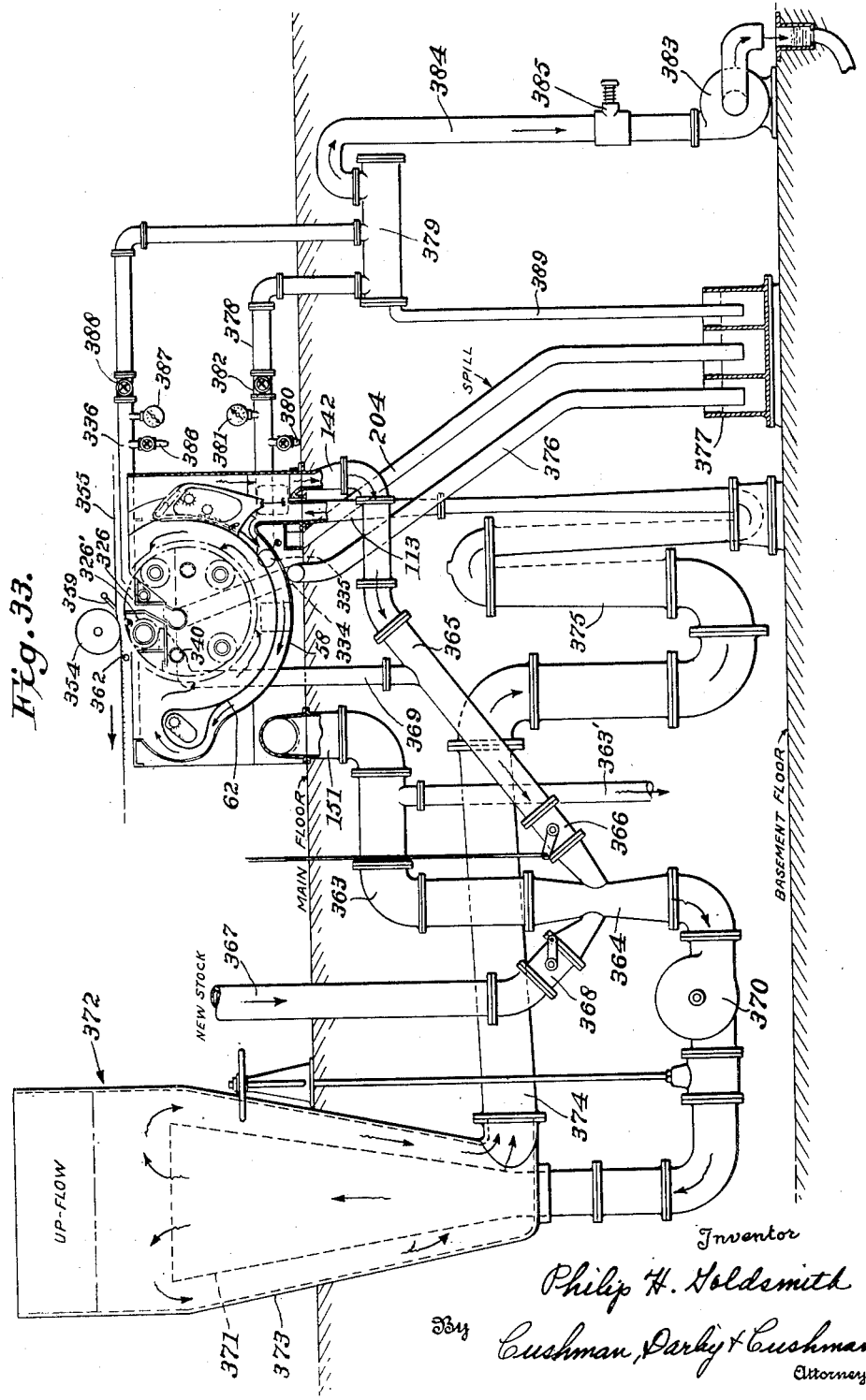

Patented Nov. 10, 1953

2,658,428

UNITED STATES PATENT OFFICE 2,658,428

ADJUSTABLE CYLINDER PAPERMAKING MACHINE

Philip H. Goldsmith, Wilmington, Del., assignor to The Pusey & Jones Corporation, Wilmington, Del., a corporation of Delaware Original application February 3, 1945, Serial No. 575,989. Divided and this application November 17, 1949, Serial No. 127,900

19 Claims. (Cl. 92—43)

This invention is a division of my co-pending application Serial No. 575,989, filed February 3, 1945, now Patent No. 2,509,296, dated May 30, 1950.

Figure 3:
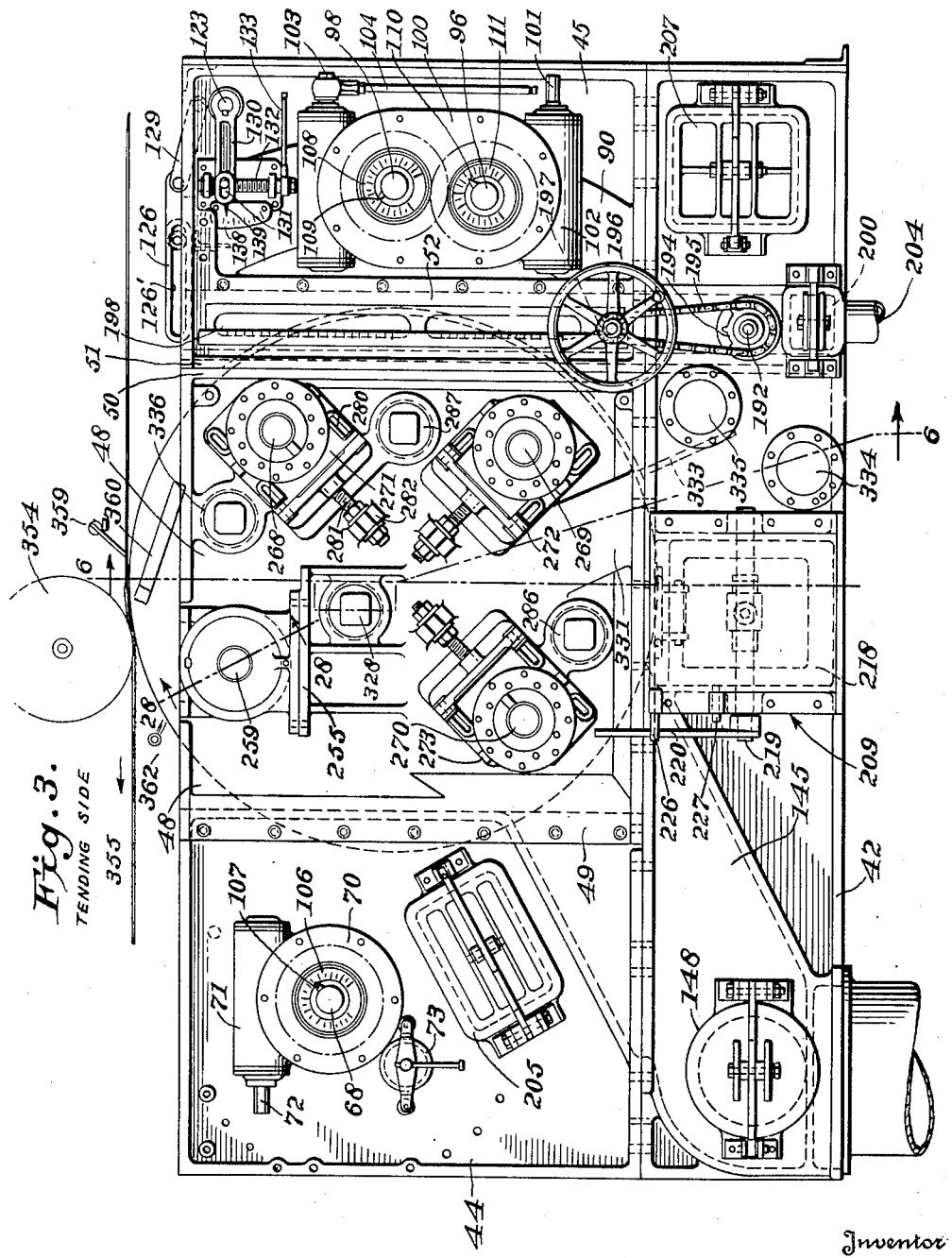
Figure 4:
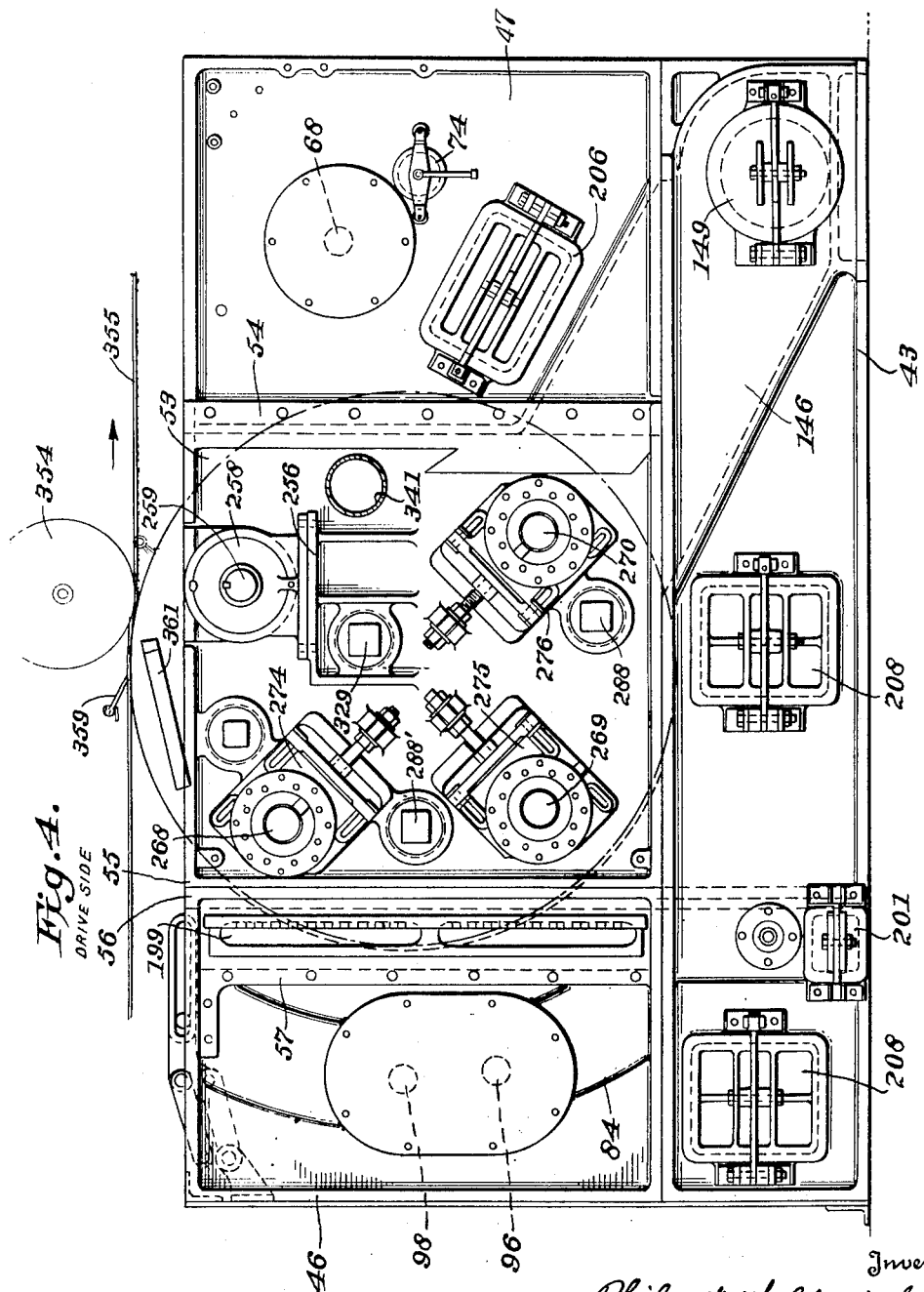
Figure 5:
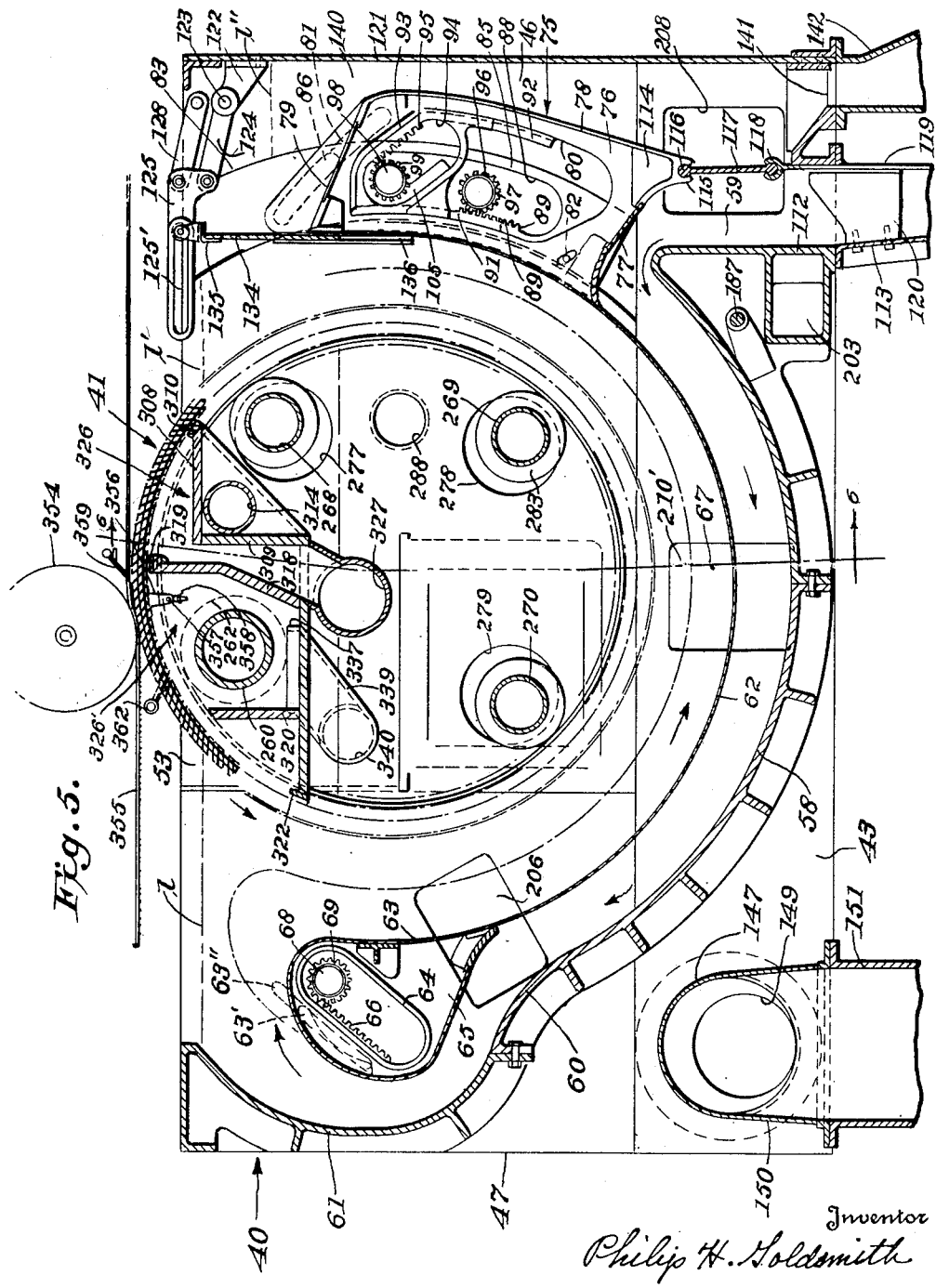
Figure 9:
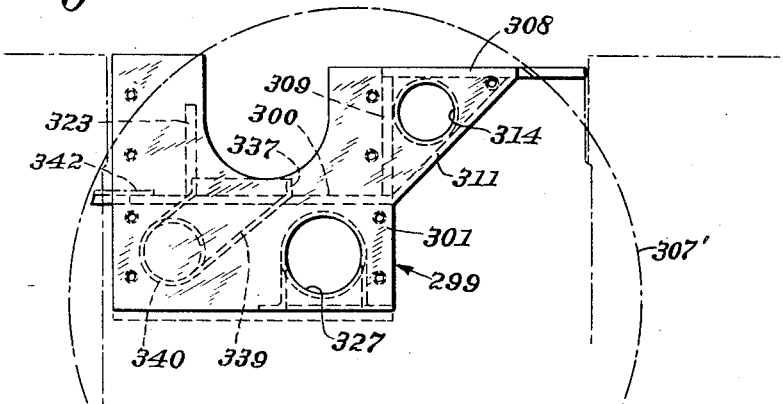
Figure 10:
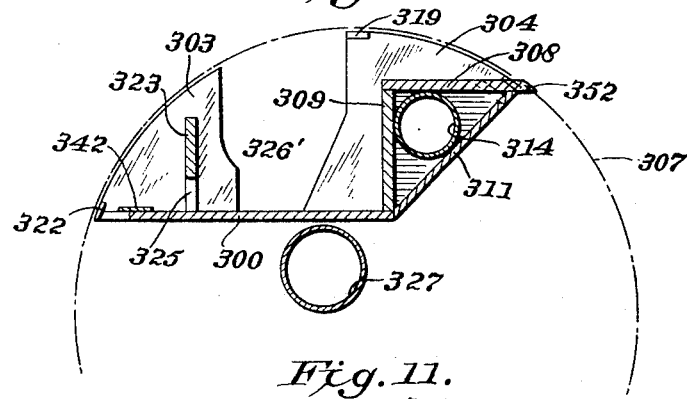
Figure 11:
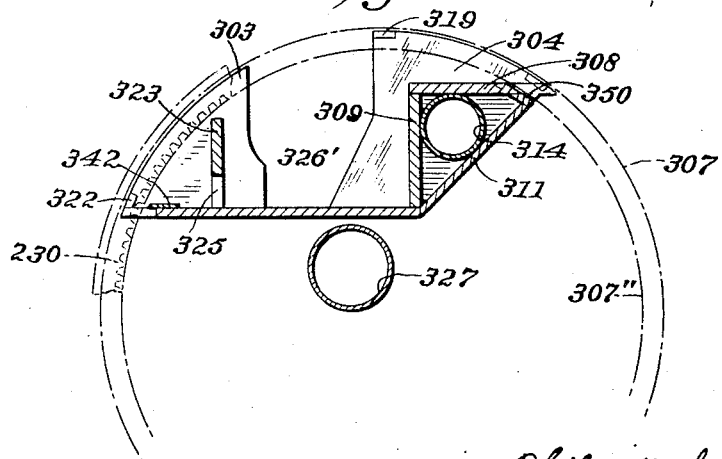

This invention relates to paper making machines of the cylinder type and has as its main object the provision of a machine capable of forming a uniform web at much higher speeds, and/or with a wider range of stocks, than heretofore possible. The improved performance is made possible by a number of features, notably a new mold construction, mold drive means, and vacuum and pressure box arrangement, and a new vat construction involving an adjustable circle, an adjustable dam for the circulating stock associated with the circle, and telescoping spill gates for the white water. These and other features of improvement are shown in practical embodiment in the accompanying drawings, in which Figure 1 is a plan view of the new machine, Figure 2 is an end elevation, Figure 3 is a side elevation, tending side, Figure 4 is a side elevation, drive side, Figure 5 is a section substantially on line 5—5 of Figure 2, Figure 6 is a section substantially on line 6—6 of Figure 5, Figure 7 is a plan view of vacuum box structure, Figure 8 is a side elevation of the structure shown in Figure 7, Figure 9 is an end elevation of the structure of Figures 7 and 8, Figure 10 is a section substantially on line 10—10 of Figure 7, Figure 11 is a section substantially on line 11—11 of Figure 7, Figure 12 is a section substantially on line 12—12 of Figure 7, Figure 13 is a section substantially on line 13—13 of Figure 7, Figure 14 is a section substantially on line 14—14 of Figure 7, Figure 15 is an elevation of a part of a vat inner side wall, Figure 16 is a side elevation of the back head of and adjustable vat circle, Figure 17 is a section substantially on line 17—17 of Figure 16, Figure 18 is an elevation of vertical supporting slide for the back head, Figure 19 is an elevation of the upper portion of the slide of Figure 18 as seen from the right of the latter, Figure 20 is an elevation of a horizontal adjusting slide for the back head, Figure 21 is an elevation of the slide of Figure 20 as seen from the right of the latter, Figure 22 is a cross-section of a pressure chamber, Figure 23 is a horizontal section of an end portion of a cylinder mold and adjacent vat, Figure 24 is a section substantially on line 24—24 of Figure 23, Figure 25 is a section substantially on line 25—25 of Figure 23, Figure 26 is a section of a structural element which appears in Figure 23, Figure 27 is a partial elevation of a vane forming a part of the mold, Figure 28 is a broken section substantially on line 28—28 of Figure 3, Figure 29 is a view partly in elevation and partly in vertical section of a vat dump valve, Figure 30 is a vertical section, taken longitudinally of the machine, of a spill chamber, Figure 31 is a section, taken across the machine, of the spill chamber of Figure 30 and another spill chamber at the opposite side of the machine, Figure 32 is an enlarged view of the lower portion of the spill chamber of Figure 30 with parts in a different relation, and Figure 33 is a diagram of a complete system incorporating the new machine.

Referring to the drawings and first to Figures 1 to 5, reference numeral 40 designates generally the vat and reference numeral 41 the mold. The vat is rectangular in plan and at the tending side, Figure 3, comprises a longitudinal base member 42, and at the drive side, Figure 4, a generally similar longitudinal base member 43. End side wall members 44 and 45 are secured on top of the base member 42, and similar end members 46 and 47 are secured on top of the base member 43. Reference numeral 48 designates a central side wall portion which has a flange 49 lapping the outer margin of member 44 and a flange 50 which butts the vertical face 51 of a spill chamber cover 52 which is bolted to and forms a part of member 45. Member 48 is bolted and sealed throughout its side and bottom edges, its bottom edge butting the longitudinal base member 42.

Reference numeral 53 designates a central wall member on the drive side of the machine having a vertical flange 54 lapping the margin of member 47 and bolted thereto and a flange 55 butting the vertical face 56 of a spill chamber cover 57 which forms a part of member 46.

Members 48 and 53, as will be later explained, support the mold and the vacuum box structure, forming therewith a rigid unit which can be readily set in position or removed.

Referring particularly to Figure 5, reference numeral 58 designates a fixed outer circle which is supported between the base members 42 and 43 and the end wall portions 44 and 47, the circle being substantially concentric with the cylinder from an inlet 59, which extends the full width of the vat, around to a point 60 from which point the circle bulges outwardly into a portion 61 of smaller radius.

Reference numeral 62 designates an inner vat circle formed of flexible sheet material, preferably stainless steel, Monel metal, or bronze. At its left end, Figure 5, the sheet is looped to provide a tear drop formation or front head 63 in which is disposed a tubular member 64 of oblong section which extends between closed side walls, as at 65, of the head 63, the ends of tube 64 being open. Desirably, seals can be provided around the ends of tube 64 for contact with the inner side walls of the vat whereby to prevent the entrance of stock into the tube. Disposed along the outer inclined margins of the tube 64 are a pair of racks as at 66 which are arcuate substantially on a center 67 below the cylinder.

Reference numeral 68 designates a shaft extending through the tube 64 and journalled in the vat wall portions 44 and 47, the shaft having fixed thereto gears as at 69 which engage the racks as at 66. On the tending side, shaft 68 has fixed thereto a worm wheel in a housing 70, the worm wheel being engaged by a worm in a housing 71, the worm being mounted on a shaft which has a squared projecting end 72 which is engageable by a suitable wrench. By rotating shaft 72, the gears as at 69 can be driven in either direction to adjust the front head 63 of the inner circle between the full and dotted line positions shown, the two sets of gears and racks holding the head square across the vat. Wash-out doors for the tube 64 are shown at 73 and 74, Figures 3 and 4.

Referring to Figures 5 and 15 to 21, the circle 62 at its other end is fixed to a back head 75 which comprises open side frames 76 and 76a which are connected at the left by the upper portion of the circle and otherwise by walls 77, 78 and 79. The openings 80 and 80a of the side frames are connected by a tube 80', Figure 17. The outer faces of the side frames are provided with grooves 81, 82, and 81a, 82a, which are arcuate substantially about the point 67.

Reference numeral 83 designates an arcuate groove in the vat wall portion 46, the contour of the groove being shown also at 84 in Figure 4, the groove being arcuate substantially about the mold center. Reference number 85 designates an arcuate slide disposed in the groove 83 and having an arcuate key 86 slidable in the way 81 and a pin 87 slidable in the way 82. Slide 85 has an elongated opening 88 on the inner side of which is a series of rack teeth 89 which are parallel to the edges of the slide. An exactly similar slide is arranged in a way in the opposite side wall of the vat, its contour being designated at 90, Figure 3.

Slidable on parallel rails as at 91, 92 and 91a, 92a of the side frames 76 and 76a are slides as at 93, Figures 5 and 20, these having openings as at 94 provided with a series of rack teeth 95 which are arcuate substantially on the center 67. A shaft 96 is journalled in the vat side walls and has gears as at 97 engaging the racks as at 89 of the slides as at 85. A shaft 98 journalled in the vat side walls is equipped with gears as at 99 engaging the rack teeth as at 95 of the slides as at 93. The shaft 96 has a worm fixed thereto in a housing 100, Figure 3, and engaged by a worm which has a squared operating shaft 101 projecting from a housing 102. Shaft 98 has a similar worm wheel and worm connection, the worm shaft having a projecting squared end 103 shown as engaged by a reversible ratchet wrench 104 which is also applicable to the shaft ends 72 and 101. Shafts 96 and 98 both pass through the openings as at 88 in the slides as at 85, while shaft 98 also passes through the openings as at 94 of the slides as at 93.

As shaft 96, Figure 5, is rotated clockwise, the slides as at 85 are moved equally upwardly carrying the back head and lifting the attached end of the inner circle. During this adjustment the slides as at 93 remain stationary, the end frames sliding upwardly relative to them. The gears as at 99 are held in mesh with the rack teeth due to engagement of the shaft 98 with opposed locating flanges, as at 105, of the slides as at 93. As shaft 98 is turned in a counter-clockwise direction, Figure 5, the slides as at 93, and therewith the entire back head are carried toward the mold as guided by the key and groove connections with the slides as at 85. With the maximum inward adjustment at both ends of the inner circle and with maximum vertical adjustment of the back head 75, the circle will occupy the dotted line position shown in Figure 5. The point 67 is midway between the two extreme positions of the inner circle on a vertical radius of the mold.

Considering the parts as occupying the position shown in Figure 5, inward and upward adjustment of the front head 63 will not substantially affect the bottom portion of the inner circle, and this adjustment can be read on a scale 106 from a pointer 107 on shaft 68, Figure 3. Similarly, if shaft 98 is turned to move the back head 75 from the position shown in Figure 5, the bottom of the inner circle will not be materially affected and the adjustment can be read on a scale 108 from a pointer 109 on shaft 98. In order to adjust the bottom circle, shaft 96 is turned and this will not substantially affect the circle otherwise. This is because the back head moves in a path substantially concentric with the mold. This adjustment is registered by a pointer 110 fixed on shaft 96 and cooperating with a scale 111.

The side edges of the inner circle between the heads have a slight clearance with the smooth inner surfaces of the vat side walls and consequently distortion due to frictional drag is prevented and the inner circle, supported only at its ends, always takes a definite contour, i. e., flexure curve, as determined by the head adjustments.

The inlet opening 59 is defined by a front wall 112 which depends from a rounded formation at the leading edge of the fixed circle 58, and the side walls of the inlet opening are defined by inner face portions of base elements 42 and 43. The lower end of the opening is in connection with a feed section 113 which, like the opening 59, extends the full width of the vat. At the juncture of walls 77 and 78 of the back head 75, there is provided a fitting 114 having a downwardly opening horizontal cylindrical channel 115 in which is engaged a cylindrical rod 116 which carries a sheet or curtain 117 having a horizontal hinge connection 118 with a sheet or curtain 119 which is held slidably against the rear wall of feed conduit 113 by means of guides as at 120 fixed to the front wall of the conduit. The curved bottom wall 77 of the back head and curtain portions 117 and 119 constitute the back wall of the inlet opening. Due to the hinged curtain portions, the back wall is self-adjusting with the back head. To avoid air binding at the top of the inlet, a vent tube 77' is led from an opening in wall 77, at its highest point, through and above the top wall 79 of the back head. Otherwise, the inlet could not rise above the bottom level of the adjustable circle.

The stock rises in the inlet opening 59 and flows between the outer and inner circles in the direction of the arrows and over the front head which constitutes a making board. The curve 61 is designed with reference to the front head 63 to bring the flow quietly over the head, the top of the curve preferably not exceeding 45° from the vertical so as to avoid a ledge under which foam could accumulate. The stock then flows in the direction of the arrows between the inner circle and the mold and rises to a height determined by a circulating stock dam.

Reference numeral 121 designates a vat end wall extending between vat portions 42, 43 and 45 and 46, thus closing the end of the vat from top to bottom. Pivoted in brackets as at 122 which project inwardly from near the top of wall 121 is a rock shaft 123 which has fixed thereto adjacent the vat sides, arms as at 124, Figure 5, whose free ends are pivoted to bars 125 and 126 which have longitudinally extending guide slots 125' and 126'. Also pivoted to bars 125 and 126 are links 128 and 129 whose other ends are pivoted to the vat sides so that a parallelogram arrangement with the arms as at 124 is provided. Shaft 123 extends through the vat side wall of the tending side, Figure 3, and has fixed thereon an arm 130 having a forked slotted end engaging trunnions on a nut 131 engaged with a threaded vertical shaft 132 which is journalled on the side member 45 and is equipped with a reversible ratchet wrench 133. By suitably rotating shaft 132, nut 131 is moved up or down to correspondingly swing arm 130 and rock shaft 123 so that the bars 125 and 126 can be lifted or lowered, always in horizontal position.

Reference numeral 134 designates a plate or curtain having a top angle 135 provided with pins engaged in the slots of bars 125 and 126. The side edges of curtain 134 are guided at their lower ends in grooves 136 and 137, Figures 5 and 17, in the side frames 76 and 76a of the back head 75. Regardless of the position of the back head, curtain 134 can be lifted and lowered by rocking shaft 123 and the adjustment can be read on a scale 138, Figure 3, with which cooperates a pointer 139 at the free end of arm 130. Also, with the curtain at any adjusted elevation, the back head can be freely moved horizontally and vertically due to the sliding provisions. The range of adjustment of the bars 125 and 126 and of the back head is such that there will be no jamming of parts when the former are in their lowest position and the latter is in its topmost position. In Figure 5, curtain 134 is at top adjustment somewhat higher than it would be in actual use. The ordinary liquid level in the vat at the making board side is indicated by the letter $l$, and at the overflow side by the letter $l'$.

The stock overflowing the dam constituted by the curtain 134 passes into a chamber 140, Figures 1 and 5, defined at its rear by the vat wall 121 and at its front by the curtain 134, the back head 75, and the curtain portions 117 and 119; the sides of the chamber 140 being defined by the inner surfaces of the vat side wall members 45 and 46 and of the base members 42 and 43. The stock level in chamber 140 will generally be about as indicated by the line $l''$. Chamber 140 has an elongated bottom opening 141 in connection with an adapter 142 which changes, with substantially constant cross-sectional area, to the diameter of the circulating stock pipe.

Reference numerals 143 and 144, Figure 6, designate white water chambers at the ends of the mold, these being connected by cored conduits 145 and 146 with the ends of a white water cross pipe 147 whose extremities are closed by wash out doors 148 and 149. Reference numeral 150, Figures 1, 2 and 5, designates a center connection from the pipe 147 to a white water down pipe 151. Adjacent the white water chambers 143 and 144 are white water spill chambers 152 and 153, Figures 1 and 30 to 32. The chamber 152 is defined by the member 45 and the cover plate 52 and has a rear wall 154 which is an integral part of member 45. Chamber 152 comprises a lower portion 152' cored in the longitudinal member 42.

Opposed vertically extending grooves 155 and 156 extend from the top of the vat to the bottom of chamber 152 and slidably receive a telescoping gate 157. Gate 157 comprises a top section including a rectangular plate 158 and a strip 159 secured along its top margin, the plate and strip filling the grooves 155 and 156 transversely with a loose sliding fit. Secured along the lower margin of plate 158 on the same side as strip 159 is a strip 160 which is engaged under a similar strip 161 secured along the top margin of a rectangular plate 162. Secured along the opposite top margin of plate 162 is a strip 163 giving a loose sliding fit in the guide grooves. Secured along the lower margin of plate 162 at the same side as strip 161 is a similar strip 164, and secured along the opposite lower margin of plate 162 is a still narrower strip 165 which takes under a similar strip 166 secured along the top margin of a rectangular plate 167. Secured along the bottom margin of plate 167 on the same side as strip 166 is a strip 168 which is of the same width as the first strip 159.

In Figure 32, the gate sections are shown in fully telescoped relation entirely within chamber portion 152' and resting on a filler block 169. If the top section is pulled upwardly, its strip 160 will eventually engage strip 161 of plate 162 and the latter will be pulled upwardly, its strip 165 eventually engaging strip 166 and pulling plate 167 upwardly. With the gate all the way up, the top section abuts a filler block 170 fixed in the top of the guide grooves. To prevent any tendency for the sections to stick together so that the bottom section would be pulled above the bottom of the white water chamber at the end of the mold, the bottom strip 168 may be provided with pins as at 171 which will engage fixed lug portions as at 172. In Figure 31, reference numeral 173 designates the lower section of a telescoping gate, exactly like the gate 157, arranged in the chamber 153, and in Figure 1, reference numeral 174 designates a filler block at the top of the guide grooves of chamber 153.

Reference numerals 175 and 176 designate brackets fixed to chamber wall 154 and to the back wall of chamber portion 152' and rotatably supporting the ends of a screw shaft 177 which engages a nut 178 having a horizontal pivotal connection 179 with a fitting 180 fixed to plate 158. Fixed to the lower end of shaft 177 is a bevel pinion 181. Reference numeral 182 designates a similar screw shaft for the drive of the gate of chamber 153, shaft 182 having a bevel pinion 183 fixed to its lower end. Pinions 181 and 183 engage bevel pinions 184 and 185 on a suitably journalled cross shaft 186, the shaft, for convenience of installation, including a central portion 187 supported in bearings 188 and 189. The central shaft portion is connected to end portions 192 and 193 through jaw couplings 194 and 195. Fixed to the shaft end 192 on the tending side of the machine, Figure 3, is a sprocket 194 engaged by a chain 195 which runs to a sprocket adapted to be driven by a hand wheel 196 rotatable on a stud 197 which projects from the spill chamber cover plate 52. By turning the hand wheel, the two gates are simultaneously and equally adjustable between the fully extended relation shown in Figures 30 and 31 and the fully collapsed relation shown in Figure 32. With the described inter-engagement of the gate sections, the gates can be of slight thickness so that little space is required for them. In order that the liquid level inside the mold may be readily observed, cover plates 52 and 57 may be provided with vertically extending transparent windows 198 and 199 which may be provided with scales, lights being provided in the upper ends of the spill chambers.

Chambers 152 and 153 are provided at their lower ends with wash out doors 200 and 201 at the ends of a cross chamber 203 which connects the lower ends of the spill chambers. In Figures 3 and 31, reference numeral 204 designates a spill leg extending downwardly from chamber 203.

Reference numerals 205 and 206, Figures 3, 4 and 5, designate wash out doors which give access to the vat circles just below the front head 63. Reference numerals 207 and 208 designate wash out doors giving access to the inlet 59 and lower portion of the circulating stock chamber 149. A wash out door 210' gives access to the bottom circles on the drive side of the machine while on the tending side of the machine, a dump valve 209 is provided for both bottom circles.

Referring to Figures 3 and 29, reference numeral 210 designates an opening in the inner side wall of member 42, this being ordinarily of the same size and disposition as the wash out door 210' as seen in Figure 5, the opening extending from close to the mold down to the bottom circle. The outer margins of opening 210 provide a seat for a gate 211 which is faced over its whole inner surface with soft gasket rubber 212. Gate 211 has at its upper end a rearwardly projecting lug 213 received between depending legs of a bracket 214 which support a pin 215 passing through an opening 216 in lug 213, the opening being horizontally elongated, in the closed position of the gate shown in Figure 29, so as to permit the gate to set evenly throughout. The gate is disposed in a chamber 217 closed by a side plate 218. Member 42 provides end walls for the chamber 217 and in these walls is journalled a horizontal rock shaft 219 to a projecting end of which is fixed a handle 220. Keyed to shaft 219 within compartment 217 is a radially projecting socket member 221 in which is threaded the shank of a pin 222 which is connected by a toggle link 223 with flanges as at 224 on the back of gate 211. In the full line position of parts, Figure 29, the toggle is slightly broken downwardly and handle 220 is held against an abutment portion 225 by axially movable pin 226. By pushing pin 226 to the right, Figure 3, handle 220 can be swung downwardly to open the gate, the parts assuming the dotted line position, Figure 29, and being retained by a sliding pin 227 which takes over the handle. Any liquid in the vat flows through chamber 217 and out to a sewer or drain through a bottom opening 228. When the valve is open, both the outer and inner circles are simultaneously dumped.

The mold 41 comprises a pair of concentric end rings 229 and 248 to which are secured a multiplicity of forwardly pitched vanes or blades 231, Figures 6 and 23 to 27.

The end ring 229 comprises a portion 230 having an inner face 230' in which is formed a number of concentric annular grooves 232. The ring portion 230 has an outer peripheral face 233 which terminates at a radial shoulder 234 surmounted by a conical face 235 which extends upwardly and outwardly to an annular groove 236 bounded outwardly by an annular end flange 237 having an outer flat face 238. The inner face of ring portion 230 is provided with an annular rabbet 239.

Between the faces 234 and 238, ring portion 230 is provided with a multiplicity of forwardly pitched grooves 240. Each vane 231 is in the form of a relatively thin slat of suitable metal, such as stainless steel, with its longitudinal edges preferably rounded as particularly shown in Figure 24. Adjacent each end, the vane is cut away at its lower margin to provide a reduced portion 241 which is received in a slot 240. The depth of the slot 240 is indicated by the line 242 in Figure 26 and below this line, the shoulder 243 of the vane abuts the face 234 of the ring member 230. The top of each slot 240 is filled with weld metal 244 and smoothed off. To further secure the vanes in place, they are notched in register with the groove 236 and by a ring 245 is shrunk into the groove, thereby securely locking the vanes to the ring member.

The ring 229 also includes an internally toothed ring gear 246 which is screwed to the outer face of ring member 230 and extends into the rabbet 239, and between the rabbet and face 230' an annular track 247 is screwed to the inner face of the ring member, the track having a diameter equal to the pitch diameter of gear 246.

The other ends of the vanes 231 are similarly secured to the other end ring 248 which is of the same construction as ring 229. Reference numeral 249 designates intermediate rings of round cross section which are threaded through opening in the vanes 231 and welded in the manner particularly shown in Figure 24. Rings 249 are originally split, having their ends welded together after assembly with the vanes.

As shown in Figure 27, the outer edges of the vanes are provided with notches 231' which succeed each other spirally around the cage constituted by the rings and vanes, and have set therein a winding wire 250 which, as shown in Figure 23, is in the form of a narrow strip disposed on edge in the notches. The winding wire supports a backing wire 251 which, in turn, supports a face wire 252 and the ends of the backing and face wires are clamped against the outer faces of the end rings by clamping rings 253 and 254. These three wires constitute the mold covering, as herein contemplated.

In Figure 27, another type of intermediate ring is shown at 249'. The vane and ring are complementarily notched in egg box fashion with the inner face of the ring flush with the inner edge of the vane to provide an uninterrupted rectilinear line along the inner edge of the vane, this line constituting an element of an imaginary cylinder. Both types of intermediate rings can be used in the same cage.

The mold, constructed as described, is extremely rigid. The forward pitching of the vanes are designed to provide a mild inward pumping action, thus avoiding injury to the forming web even at high speeds. In a 60" cylinder mold, for example, the vanes may have a width of 2½" and a thickness of ¼". As here shown, each vane is pitched forwardly 45° to a radius intersecting the half depth of the vane. The spacing of the vanes is about 1¼" between centers so that the total number of vanes is 150.

Shelves 255 and 256 projecting outwardly of the middle side wall sections 48 and 53 carry bearings 257 and 258 which may be shimmed as required and which support a mold drive shaft 259, Figures 1 to 5 and 28. As shown in the latter figure, in particular, the shaft 259 comprises a central portion 260 in the form of a forged tube. Driven into the left hand end of the tube is a journal 261 on which are keyed a roller 262 and gear 263, the diameter of the roller being the pitch diameter of the gear. The roller engages the track 247 and gear 263 engages the gear 246. The left-hand extremity of shaft 259 is formed for coupling to a suitable drive motor. Reference numeral 264 designates a spacer sleeve on the journal 261. A journal 265 is driven into the right-hand end of the tube 260 and has keyed thereon a roller 266 and a gear 267, the same as roller 262 and gear 268, which engage the track and internal gear of the mold end ring 248. The journals are packed where they pass through the mold side wall portions 48 and 53.

In addition to the drive shaft 259 at least two cooperating positioning shafts are provided, and in the present instance three are shown and designated by the reference numerals 268, 269 and 270, the shaft ends being supported in radially adjustable bearings 271, 272 and 273 on the tending side and in bearings 274, 275 and 276 on the drive side. In Figure 5, the openings in the vat side wall portion 53 through which the positioning shafts pass are indicated at 277, 278 and 279, similar openings being provided in the vat side section 48. The bearings are bolted to the mold side wall sections through slots parallel to the mold radius intersecting the axis of the associated shaft. Radial adjustment is effected by threaded studs as at 281 extending through lugs as at 282 and equipped with clamping nuts.

Positioning shaft 269 is shown in Figure 6 and like the drive shaft, comprises a central tubular section having journals driven in its ends. Fixed on the left hand journal are a roller 283 and a gear 284 which respectively engage track 247 and gear 246. Fixed on the right-hand journal of shaft 269 is a roller 285 which engages the track of the mold end ring 248, and other rollers could engage intermediate mold rings such as the rings 249' of Figure 27. The diameter of rollers 283 and 285 is the pitch diameter of gear 284 so that they rotate with the tracks without slipping. Means such as disclosed are provided for driving the positioning shafts so as to prevent the possibility of their standing still so that the rollers would be worn unevenly and would thus cause vibration when again rotating.

The illustrated position for the drive shaft 259 is selected since, as will be hereinafter described, it enables the shaft to be positioned in a slice box with the zone of engagement of the gear teeth out of water. Furthermore, this positioning of the relatively strong drive shaft enables the weight of the customary couch roll and its lever weighting, in addition to the weight of the mold, to be supported without distortion of the shaft. Each end of the mold is driven so that torsional strains are avoided.

Reference numerals 286 and 287 represent wash out plugs at the tending side of the mold end and reference numerals 288, 288' designate wash out plugs in the side wall at the drive side of the mold end.

In Figure 6, reference numerals 289 and 290 designate chime rings in the form of arcuate angles which are fixed to the vat side, extending to the top of the latter, with outer peripheral surfaces flush with the peripheral surfaces of the ring gears, which latter, constitute cooperating chime rings. Reference numerals 291 and 292 designate garter straps which bridge the clearance between the chime rings. As shown in Figure 23, the strap 291 comprises an annularly channeled rubber strap 293 straddling the clearance with grooved legs resting on the rings, the rubber strap being fixed to a backing strap 294 of heavy canvas or the like. The ends of the straps are equipped with threaded studs which are connected by nuts with ears provided on brackets 295, 296, 297, and 298, Figure 1, fixed on the middle side wall portions of the vat. The straps are readily removable to permit the removal of the mold.

Referring particularly to Figures 6 to 14, a vacuum box structure generally designated by the reference numeral 299 comprises a flat horizontal base plate 300 which extends between vertical parallel end walls 301 and 302 of which the former appears in elevation in Figure 9. The end plates are adapted to be screwed against the inner faces of the removable middle side walls of the vat. Spaced inwardly of the end plate 301 are aligned vertical wall portions 303 and 304 which are parallel to the end plate. Similar wall portions 305 and 306 are similarly spaced inwardly of plate 302. The wall portions 303 and 304 are shown in elevation in Figures 10 to 12 and from these figures it will be seen that their upper edges are curved on the center of the mold and on a diameter slightly less than the diameter of the path of the inner edges of the vanes 231, this path being indicated by the dotted circle 307. In Figure 9 the dotted circle 307' is the outer periphery of gear 246, in Figure 11 the circle 307" is the addendum line of gear 246, and in Figure 12 the circle 307''' is the inner periphery of the roller ring 247.

Reference numeral 308 designates a horizontal wall in a plane above the wall 300 and having its ends fixed to the end walls 301 and 302. A vertical wall 309 extends between plates 308 and 308 and has its ends secured to the end walls 301 and 302. The outer edge of plate 308 within the mold, extends adjacent the circle 307 and has fixed thereto a sealing strip 310 which is about $\frac{1}{16}$" inwardly of circle 307. Aligned plates 311 and 312 extend between the outer, lower margin of plate 308 and the adjacent edge of plate 309, the inner ends of plates 311 and 312 being spaced apart to provide an open central recess 313. Reference numerals 314 and 315 designate pipes which extend through the end plates 301 and 302 and through walls 316 and 317 which close the sides of the cavity 313. The outer end of one or the other of pipes 314 and 315 is plugged while the outer end of the other pipe, shown as being the pipe 314, Figure 6, is in connection with a suction pipe 336.

Reference numeral 318 designates a horizontally bent wall rising from plate 300 and extending between wall portions 304 and 306 and having a vertical upper portion adjacent wall 309 provided along its upper edge with a sealing strip 319 which is spaced about $\frac{1}{16}''$ from the circle 307. A vertical wall 320 extends between wall portions 303 and 305, and an arcuate plate 321 connects the top of wall 320 and the outer edge of the bottom wall 300, the outer surface of wall 321 lying close to the circle 307. A sealing strip 322 extends along the lower outer margin of wall 321 and is spaced about $\frac{1}{16}''$ inwardly of circle 307. Reference numerals 323 and 324 designate vertical wall portions extending between walls 301 and 303 and between walls 302 and 305, respectively. As indicated in Figures 10 and 11, the wall portion 323 has a bottom recess 325 which permits free flow along the top of plate 300.

As will be seen from Figure 6, the vertical wall portions as at 304 and 306 are adjacent the exposed inner faces of mold rings 248 and 229 respectively, so as to form seals therewith, the forming of the seal being aided by the grooves as at 232 in the ring face, Figures 23 and 26, which hold water. Moreover, these wall portions can coact with the end rings to prevent axial movement of the mold. Walls 308, 309 and 318 define a dry box 326, it being noted that the top of plate 308 is above the level $l'$ in the vat, Figure 5. Walls 318 and 320 define a slice box 326' which is upwardly open and which receives the drive shaft 259, a section through the portion 260 of the drive shaft appearing in Figure 5. The end wall plates are downwardly recessed, as shown, in order to pass the drive shaft.

Reference numeral 327 designates a pipe whose ends extend through the end walls 301 and 302 and are closed by wash out plugs 328 and 329. Centrally pipe 327 has a connection 330 with the dry box 326. On the tending side of the machine pipe 327 has a bottom opening communicating with a vertical conduit 331 formed in the middle mold side wall section 48 and terminating downwardly in a chamber 332 formed in the base member 42. A baffle 333 extends across the top portion of chamber 332 to the right, Figure 3, of conduit 331. The chamber has an outlet 334 to the left of and below the baffle and an outlet 335 to the right of and above the lower end of the baffle.

In Figures 7 and 9, reference numeral 337 designates a dam rimming an opening 338 formed in plate 309 between wall portions 302 and 305, the opening 338 having a connection 339 with a pipe section 340 which runs through wall 302 to an opening in the adjacent side wall of the vat in connection with a pipe 341, Figure 4.

Reference numerals 342 and 343, Figures 7 and 10 to 12, designate sealing strips secured to the edges of plate 300 between walls 301, 303, and 302, 305, respectively. Referring to the strip 343, its outer edge is contoured to form a seal with adjacent parts. The edge portion 344 extends close to the track 247 of the mold ring 229 and the edge 345 is closely adjacent the teeth of gear 246. The edge 346 lies closely along the outer face of the gear 246 and the edge 347 extends against the chime ring 289. Edge 348 lies against the vat side wall structure. It will be seen that the sealing strip 342 is conformed like the strip 343.

The wall 308 is contoured as shown in Figure 7 and in the sectional views of Figures 10 to 12. It has an edge portion 349 lying close to the roller ring, as particularly shown in Figure 12, and an edge portion 350 which lies close to the teeth of the ring gear, Figure 11. The face 351 is close to the outer face of the ring gear and the edge 352 is against a fixed chime ring of the vat, while the notch 353 receives the garter strap bracket 297, Figure 1. A similarly contoured plate portion 308a is provided between walls 302 and 305, the notch 353a receiving the garter strap bracket 295, Figure 1.

In Figures 3, 4, 5 and 33, the reference numeral 354 designates a couch roll disposed above the slice box 326' and reference numeral 355 designates a felt. Disposed in the slice box just in advance of the couch nip is an outwardly faced channel 356 having arcuate lips of a width to bridge the space between adjacent vanes and disposed about a $\frac{1}{16}''$ away from the path of the inner edges of the vanes. The channel 356 may be supported at its ends by the wall portions 304 and 306. Reference numeral 357 designates an opening at one end of the channel in connection, through a suitable control valve, with the mill air pressure system. The channel can be drained through a valve 358 at one end of the channel and toward which the channel bottom slopes.

Reference numeral 359 designates a slice cooperating with the felt, the slice water dropping into inclined troughs 360 and 361 which deliver the water onto plates 308 and 308a, Figure 7, so as to provide a water seal along edges of the plates, an effective seal being thus provided between the ring gears and roller tracks and other adjacent structure.

Reference numeral 362 designates a shower directed against the mold face outwardly of the slice box.

Referring to Figure 33, the white water is led from connection 151 through a pipe 363 to a mixer 364 of the type disclosed in my prior Patent No. 2,354,007 of July 18, 1944. If a screen is used in connection with the vat system, dilution water for the same may be taken from conduit 363 by a pipe 363'. A pipe 365 is in connection with the adapter 142 at the circulating stock outlet and leads to the mixer 364. The level of the stock in the circulating stock chamber 140 is controlled by a choke valve 366. In other words, when the valve 366 is opened fairly wide, the flow from the chamber 140 through adapter 142 and pipe 365 is increased, thereby lowering the level of the stock in the chamber 140 and, conversely, when the valve is partially closed, the discharge will be decreased and the level will be raised. New stock can be admitted to the mixer from a pipe 367 controlled by a choke valve 368. Water from the slice box 326' is led from the opening 340 to pipe 365 through a pipe 369. The stock mixture is sent by a pump 370 to an inner conical tank 371 of an up-flow head box 372, the stock flowing evenly over the upper edge of tank 371 and down into the annular space between the latter and an outer conical tank 373 which is upwardly open for air escape. The stock is led from the bottom of tank 373 through a conduit 374 to a flow spreader 375 preferably of the type disclosed in my Patent No. 2,465,445, dated March 29, 1949.

The flow spreader delivers to the conduit section 113 which is in connection with the mold inlet.

The outlet 334 of chamber 332, Figures 3 and 6, is in connection with a water leg 376 which terminates downwardly in a box 377. Outlet 335 of chamber 332 is connected by a pipe 378 with a vacuum header 379. Interposed in pipe 378 are a bleeder valve 380, a gauge 381, and a control valve 382. The header 379 is in connection with a vacuum pump 383 through a pipe 384 which includes a relief valve 385 for the control of the vacuum in the header. Pipe 336, which is in connection with pipe 314 in the mold, extends to the header 379 and has interposed therein a bleeder valve 386, a gauge 387, and a control valve 388.

A water leg 389 extends from the header 379 to the box 377 and the spill pipe 204 also extends to the box.

With the machine in operation, water is pulled inwardly by the vanes so that an effective seal is provided between them and the sealing strips 310, 319 and 322 completely across the mold. These strips have a width at least as great as the spacing of the vanes so that there will always be at least one vane opposite each strip. The provision of the water seals makes it unnecessary for the sealing strips to contact the vanes and the strips can be made of suitable hard metal. There is no wear due to friction between the mold and the sealing strips.

It has already been explained how a water seal is provided between the edges of plates 308, 308a, and the adjacent structure. Thus, together with sealing strip 310, a seal is provided across the full width of the vat just above the point of emergence.

Water entering the slice box will be maintained at the height of the dam 337 and, hence, will provide a seal between the edges of sealing strips 342 and 343 and the adjacent structure. These sealing strips, together with the sealing strip 322, provide a seal completely across the mold just below the point of submergence. When the level is above the sealing strip 322, water is prevented by the wall 321 from entering the slice chamber through the mold.

Vacuum is applied to the mold interior through pipe 336 from sealing strip 322 around the mold in the direction of the rotation to the sealing strip 310, and vacuum is applied through pipe 378 between the sealing strips 319 and 319 which define the dry box. Vacuum is thus applicable around the mold substantially all the way from the point of submergence to a point near the couch nip. Thus, very effective drainage is securable, slippage is prevented at and in advance of the point of emergence, and crushing at the couch nip is avoided. While the mold may be variously compartmented by the vacuum structure, it is preferable to provide two vacuum zones as indicated since it is sometimes of advantage to use different degrees of vacuum in the two zones. For example, the vacuum may be substantially higher in the dry box than in the remaining zone. Since a high vacuum tends to pull the web into the mold covering, effective removal of the web is assured by the use of the pressure chamber 356 disposed in advance of the point of pick up.

The new mold eliminates the usual parallel rods for the support of the winding wire. The vanes give a much more rigid support for the winding wire and allow the wire to be wound more tightly. The spacing means of rings intermediate the mold and rings can be much further apart than the spiders required for the support of the old parallel rods. These features all contribute to a mold of superior rigidity while enabling the mold face to be much more open than in prior constructions. The forward pitching of the vanes provides an inward pumping action at all speeds, i. e., the pitch is such as to overcome centrifugal force. The open mold interior reduces turbulence to a minimum and thus permits an even undisturbed laying up of the fibre mat. Also the pitched vanes insulate the outside from any internal turbulence which remains. The vacuum provisions enable the level within the mold to be maintained high with increased drainage head, thus permitting larger drainage flow to the ends at lower velocity and less turbulence. Due to the absence of obstructions to flow within the mold from the mold center to its ends, the level of the water in the mold is not substantially higher at the mold center than at the ends, thereby insuring a uniform mold head and uniform sheet weight across the forming width.

The large arc of vacuum application allows the use of vacuum without sacrificing drainage surface.

It will be understood that the disclosure herein is intended to be illustrative and not restrictive and that variations in the form and arrangement of parts are possible and are contemplated under the claims which follow.

I claim:

1. A cylinder machine comprising a vat, a mold journalled for rotation on a horizontal axis in the vat, a fixed outer circle in the vat, a back head extending transversely of and adjacent one end of the vat, a similarly extending front head adjacent the other end of the vat, an inner circle of uniformly flexible sheet metal having its ends secured to and supported exclusively by said heads, and means for adjusting at least one of said heads and the adjacent end of the inner circle on a substantially vertical path.

2. A cylinder machine comprising a vat, a mold journalled for rotation on a horizontal axis in the vat, a fixed outer circle in the vat, a back head extending transversely of and adjacent one end of the vat, a similarly extending front head adjacent the other end of the vat, an inner circle of uniformly flexible sheet metal having its ends secured to and supported exclusively by said heads, and means for adjusting one of said heads and the adjacent end of the inner circle both vertically and horizontally.

3. A cylinder machine comprising a vat, a mold journalled for rotation on a horizontal axis in the vat, a fixed outer circle in the vat, a back head extending transversely of and adjacent one end of the vat, a similarly extending front head adjacent the other end of the vat, an inner circle of uniformly flexible sheet metal having its ends secured to and supported exclusively by said heads, means for adjusting one of said heads and the adjacent end of the inner circle substantially vertically, and independent means for adjusting the same head transversely with respect to the path of adjustment of the first mentioned adjusting means.

4. A cylinder machine comprising a vat, a mold journalled for rotation on a horizontal axis in the vat, a fixed outer circle in the vat, a back head extending transversely of and adjacent one end of the vat, a similarly extending front head adjacent the other end of the vat, an inner circle of uniformly flexible sheet metal having its ends secured to and supported exclusively by said heads, and means for adjusting at least one of said heads and the adjacent end of the inner circle on an arcuate path about a center spaced vertically above the bottom of the outer circle.

5. A cylinder machine comprising a vat, a mold journalled for rotation on a horizontal axis in the vat, a fixed outer circle in the vat, a back head extending transversely of and adjacent one end of the vat, a similarly extending front head adjacent the other end of the vat, an inner circle of uniformly flexible sheet metal having its ends secured to and supported exclusively by said heads, means for adjusting one of said heads on a vertically disposed arcuate path concentric with the mold axis and independent means for adjusting the last mentioned head transversely on an arcuate path concentric with a center spaced vertically above the bottom of the outer circle.

6. A cylinder machine comprising a vat, a mold journalled for rotation on a horizontal axis in the vat, a fixed outer circle in the vat, a back head extending transversely of and adjacent one end of the vat, a similarly extending front head adjacent the other end of the vat, an inner circle of uniformly flexible sheet metal having its ends secured to and supported exclusively by said heads, and means for adjusting the front head on an upwardly and rearwardly inclined path.

7. A cylinder machine comprising a vat, a mold journalled for rotation on a horizontal axis in the vat, a fixed outer circle in the vat, a back head extending transversely of and adjacent one end of the vat, a similarly extending front head adjacent the other end of the vat, an inner circle of uniformly flexible sheet metal having its ends secured to and supported exclusively by said heads, means for adjusting the back head on a substantially vertically disposed path and means, independent of the last mentioned means for adjusting the back head on a forwardly and upwardly inclined path.

8. A cylinder machine comprising a vat, a mold journalled for rotation on a horizontal axis in the vat, a fixed outer circle in the vat, a back head extending transversely of and adjacent one end of the vat, a similarly extending front head adjacent the other end of the vat, an inner circle of uniformly flexible sheet metal having its ends secured to and supported exclusively by said heads, means for adjusting the front head on an upwardly and rearwardly inclined path, means for adjusting the back head on a substantially vertically disposed path and means, independent of the last mentioned means for adjusting the back head on a forwardly and upwardly inclined path.

9. A cylinder machine comprising a vat, a mold journalled for rotation on a horizontal axis in the vat, a fixed outer circle in the vat, a back head extending transversely of and adjacent one end of the vat, a similarly extending front head adjacent the other end of the vat, an inner circle of uniformly flexible sheet metal having its ends secured to and supported exclusively by said heads, substantially vertically disposed racks connected to one of said heads, a transverse shaft supported by the vat side walls, and gears fast on said shaft meshing with said racks, whereby rotation of the shaft displaces said head on a substantially vertical path for adjustment of the adjacent end of the inner circle.

10. A cylinder machine comprising a vat, a mold journalled for rotation on a horizontal axis in the vat, a fixed outer circle in the vat, a back head extending transversely of and adjacent one end of the vat, a similarly extending front head adjacent the other end of the vat, an inner circle of uniformly flexible sheet metal having its ends secured to and supported exclusively by said heads, substantially vertically disposed racks connected to one of said heads, a transverse shaft supported by the vat side walls, gears fast on said shaft meshing with said racks, whereby rotation of the shaft displaces said head on a substantially vertical path for adjustment of the adjacent end of the inner circle, and means for displacing said head transversely with respect to said rack and gears, to adjust the head and the adjacent end of the inner circle laterally.

11. A cylinder machine comprising a vat, a mold journalled for rotation on a horizontal axis in the vat, a fixed outer circle in the vat, a back head extending transversely of and adjacent one end of the vat, a similarly extending front head adjacent the other end of the vat, an inner circle of uniformly flexible sheet metal having its ends secured to and supported exclusively by said heads, an upwardly and laterally inclined rack connected to one of said heads, a transverse shaft carried by the vat side walls, and gears fast on said shaft meshing with said racks, whereby rotation of the shaft displaces said head and the adjacent end of the inner circle on an upwardly and laterally inclined path.

12. In a cylinder machine, a vat, a fixed outer circle in the vat, an inner circle of flexible sheet material supported in the vat and extending from side wall to side wall of the latter, means for adjustably supporting the position relative to the vat of one end of the inner circle, both vertically and horizontally, an upright plate constituting a stock overflow dam slidably connected to and extending upwardly from said one end and extending between the side walls of the vat, and means on the vat, independent of the means for supporting the inner circle, supporting the upper end of said plate for vertical and horizontal movement.

13. In a cylinder machine, a vat, a fixed outer circle in the vat, an inner circle of flexible sheet material supported in the vat and extending from side wall to side wall of the latter, means for supporting and horizontally adjusting one end of the inner circle, an upright plate constituting a stock overflow dam slidably connected to and extending upwardly from said one end and extending between the side walls of the vat, and means on the vat, independent of the means for supporting said end of the inner circle, for supporting the upper end of said plate for horizontal movement with said one end and for vertical adjustment with respect thereto.

14. In a cylinder machine, a vat, a fixed outer circle in the vat, an inner circle of flexible sheet material supported in the vat and extending from side wall to side wall of the latter, means for adjusting one end of said inner circle vertically and horizontally, an upright plate constituting a stock overflow dam slidably connected to and extending upwardly from said one end and extending between the vat side walls, horizontal bars supported on the vat at the upper end of said plate, means on the plate slidably engaging said bars for the support of the plate and to enable the plate to move horizontally with said one end, and means for vertically adjusting said bars and therewith said plate.

15. In a cylinder machine, a vat having fixed side walls, a fixed, arcuate wall extending therebetween forming an outer circle in the vat, an inner circle of flexible material extending between the side walls above the outer circle, supporting means for one end of the inner circle for vertical and horizontal adjustment adjacent one end of the vat, a vertically adjustable stock re-circulating dam slidably connected to said supporting means supported independently thereof, a vertically disposed stock inlet conduit delivering to the space between the outer and inner circles adjacent said end of the vat, and a vertically disposed re-circulating stock outlet conduit immediately adjacent to and behind the inlet to receive stock overflowing the dam.

16. In a cylinder machine, a vat having fixed side walls, a fixed, arcuate wall extending therebetween forming an outer circle in the vat, an inner circle of flexible material extending between the side walls above the outer circle, supporting means for one end of the inner circle for vertical and horizontal adjustment adjacent one end of the vat, a vertically adjustable stock re-circulating dam slidably connected to said supporting means supported independently thereof, a vertically disposed stock inlet conduit delivering to the space between the outer and inner circles adjacent said end of the vat, a vertically disposed re-circulating stock outlet conduit immediately adjacent to and behind the inlet to receive stock overflowing the dam, and a vertically slidable member connected to said supporting means and extending downwardly therefrom, for separating the inlet from the outlet.

17. In a cylinder machine, a vat having fixed side walls, a fixed arcuate bottom wall providing a fixed outer circle, a stock inlet extending the full width of the vat at the rear end of the bottom wall, a re-circulating stock outlet extending the full width of the vat behind the inlet, a flexible inner circle extending between the side walls above the outer circle, means above the inlet and outlet for supporting the rear end of the inner circle, said supporting means being mounted for vertical adjustment, and a vertically slidable partition connected to and depending from said supporting means and connected to the inlet, separating the inlet from the outlet.

18. In a cylinder machine, a vat having fixed side walls, a fixed arcuate bottom wall providing a fixed outer circle, a stock inlet extending the full width of the vat at the rear end of the bottom wall, a re-circulating stock outlet extending the full width of the vat behind the inlet, a flexible inner circle extending between the side walls above the outer circle, means above the inlet and outlet for supporting the rear end of the inner circle, said supporting means being mounted for vertical and horizontal adjustment, and a vertically slidable and forwardly and rearwardly swingable partition connected to and depending from said supporting means and connected to the inlet, separating the inlet from the outlet.

19. Structure according to claim 18 wherein a vertically adjustable re-circulating stock overflow dam is slidably connected to the means for supporting the rear end of the inner circle.

PHILIP H. GOLDSMITH.

References Cited in the file of this patent
UNITED STATES PATENTS

| Number | Name | Date |
|---|---|---|
| 449,251 | Decker et al. | Mar. 31, 1891 |
| 622,489 | Bergstrom | Apr. 4, 1899 |
| 1,627,882 | Berry | May 10, 1927 |
| 1,746,708 | Mansfield | Feb. 11, 1930 |
| 1,766,000 | Parker | June 24, 1930 |
| 1,957,824 | Fieberts | May 8, 1934 |
| 2,036,168 | Engert et al. | Mar. 31, 1936 |
| 2,249,128 | Goldsmith | July 15, 1941 |
| 2,275,776 | Lane et al. | Mar. 10, 1942 |
| 2,354,007 | Goldsmith | July 18, 1944 |
| 2,363,786 | Goldsmith | Nov. 28, 1944 |
| 2,402,063 | Malkin | June 11, 1946 |
| 2,412,771 | Goldsmith | Dec. 17, 1946 |
| 2,465,445 | Goldsmith | Mar. 29, 1949 |
| 2,473,270 | Adams | June 14, 1949 |
| 2,528,189 | Temperly | Oct. 31, 1950 |